Figure 1:
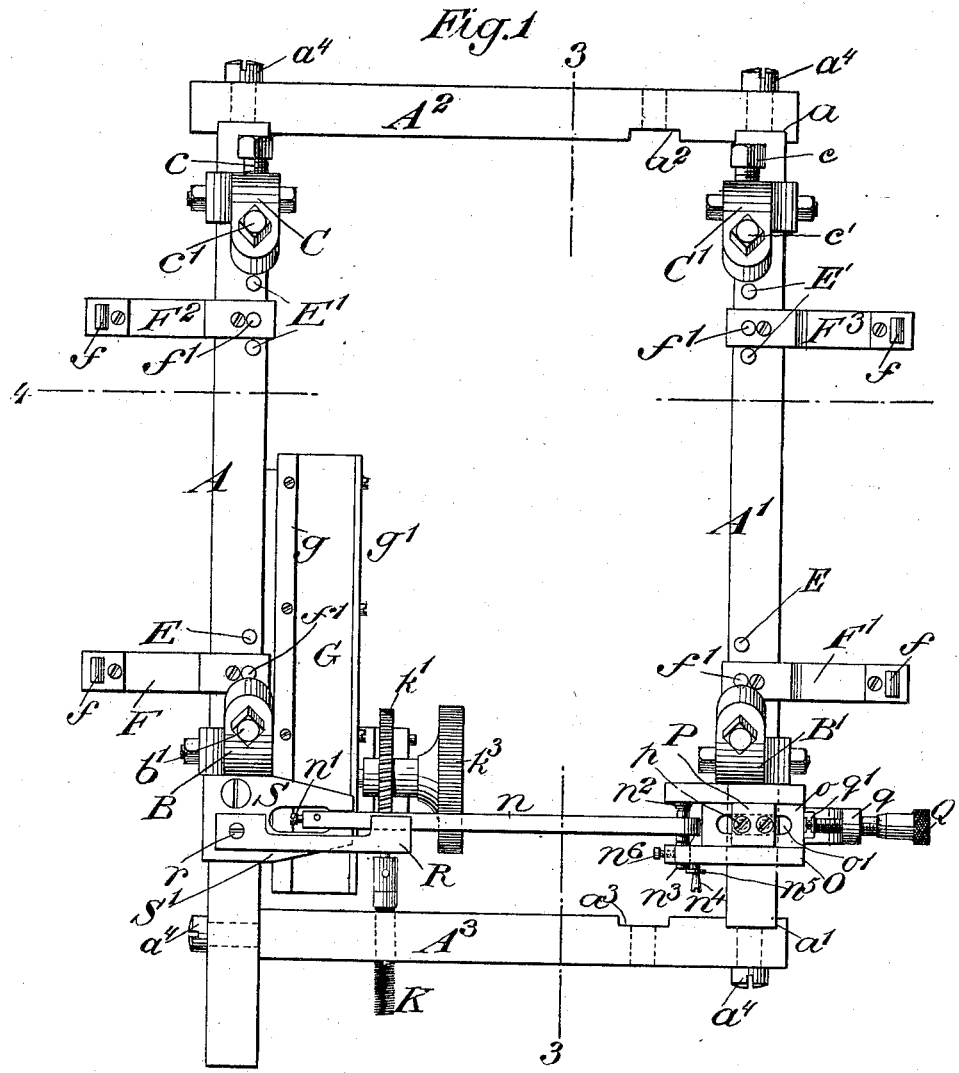

No. 628,928.  
P. H. DUDLEY.  
INSTRUMENT FOR TESTING RAILS UNDER MOVING TRAINS.  
(Application filed Nov. 23, 1897.)  
(No Model.)  
Patented July 18, 1899.  
2 Sheets—Sheet 1.

No. 628,928. Patented July 18, 1899.
P. H. DUDLEY.
INSTRUMENT FOR TESTING RAILS UNDER MOVING TRAINS.
(Application filed Nov. 23, 1897.)
(No Model.) 2 Sheets—Sheet 2.
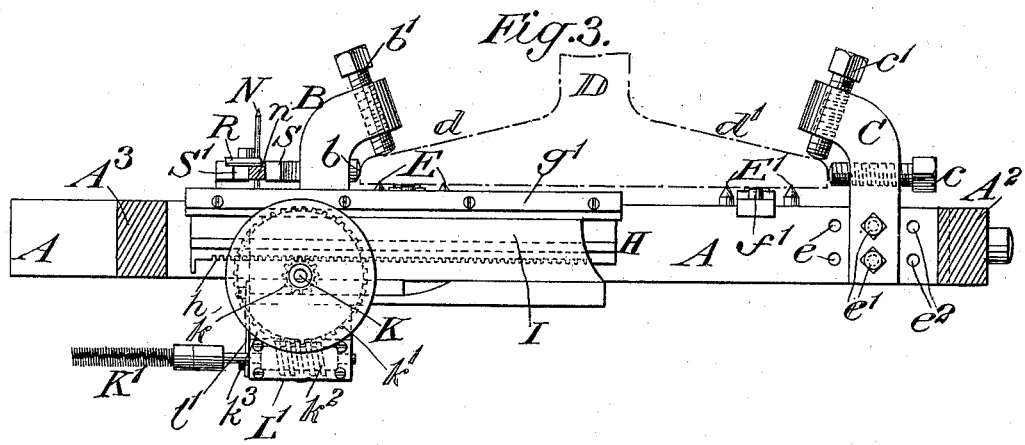
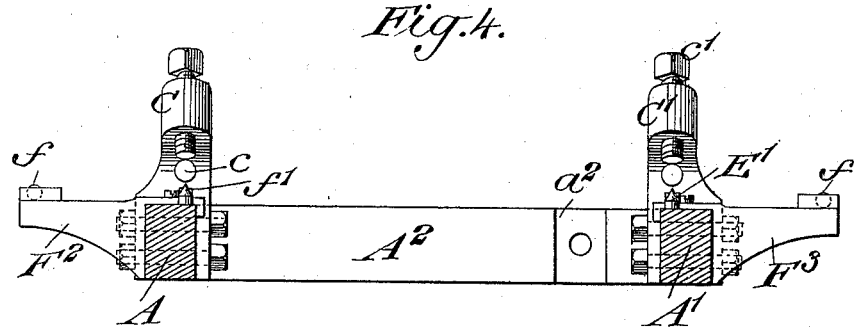
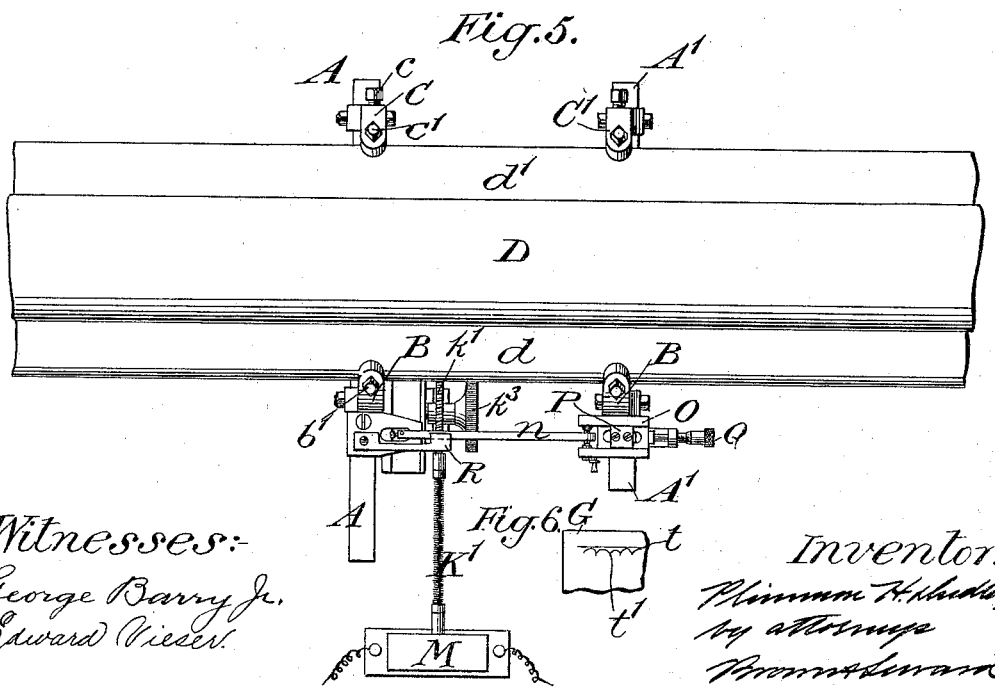
Witnesses:
George Barry Jr.
Edward Vieser
Inventor:
Plimmon H. Dudley
by attorneys
THE NORRIS PETERS CO., PHOTO-LITHO., WASHINGTON, D. C.

UNITED STATES PATENT OFFICE.

PLIMMON H. DUDLEY, OF NEW YORK, N. Y.

INSTRUMENT FOR TESTING RAILS UNDER MOVING TRAINS.

SPECIFICATION forming part of Letters Patent No. 628,928, dated July 18, 1899.

Application filed November 23, 1897. Serial No. 659,541. (No model.)

*To all whom it may concern:*

Be it known that I, PLIMMON H. DUDLEY, of New York, in the county and State of New York, have invented a new and useful Instrument for Testing Rails Under Moving Trains, of which the following is a specification.

My invention relates to an instrument for testing rails under moving trains, and more particularly to an instrument for determining the elongation and compression of the metal in a given length of the base of the rail due to the wheel-loads of the moving trains, and thereby enabling the actual fiber stresses to be ascertained.

My invention, broadly considered, comprises a recording mechanism actuated by the elongation of the metal directly under the wheel-loads and by the compression of the metal when the wheel has moved far enough to reverse the stress to make a record showing the extent of the elongation and compression of the metal, which record may be measured and the magnitude of the stresses in the rail determined by the well-known laws of mechanics of materials, and the factor of safety in the rails thereby determined and also the traffic which the track will sustain. The determinative of the actual stresses in rails under moving wheel-loads cannot in our present knowledge be directly calculated as it can be with the various members of a bridge. In a bridge the abutments and piers are fixed stable supports, and we have only to deal with the elastic properties of the metal under static and dynamic loads. With a rail in the track the case is entirely different, since the rail not only acts as a continuous girder and capable of being deflected toward the ties, but the wood of the latter is also compressed and the ties themselves sunk in the ballast, the latter compressing in the transmission of the load to the road-bed, and this, too, is depressed until the total resistance due to the falling and rising deflections of the rails, the compressing and settling of the ties, ballast, and road-bed equal the effects of the wheel-loads. Furthermore, any irregularity both in the surface of the rail and in the treads augments the dynamic effect of the wheel-load. The tie-spacing, the joints of the rails, the condition of the track, its maintenance, ballast, and wheel-spacing also affect the stresses which the rails must sustain. As the section of the rail increases as well as its stiffness the stresses decrease, other conditions remaining the same. As the speed of the trains increase the stresses in the rails are rapidly increased. The counterbalance of the locomotive may increase the stress in the rails as the speed increases. The tension set up in the rails during cold weather before the rails render or slip in the splice-bars is another and often the most potent cause of breakage of rails in cold weather, the fiber stress from this cause often amounting to ten to fifteen thousand pounds per square inch of the rail-section.

The above are some of the more important conditions which effect the stresses in the rails and are sufficient to show that the stresses set up in the rails by moving trains can only be determined by actual test, and to provide a practical means for actually testing the stresses is the object of my present invention.

While I have shown the embodiment of my present invention adapted to the testing of railway-rails under moving trains, I do not wish to limit myself to this particular use of the instrument, but wish it to be understood that it is intended for use wherever actual test is necessary to determine the safety stress to which a metallic support is to be subjected.

Figure 2:
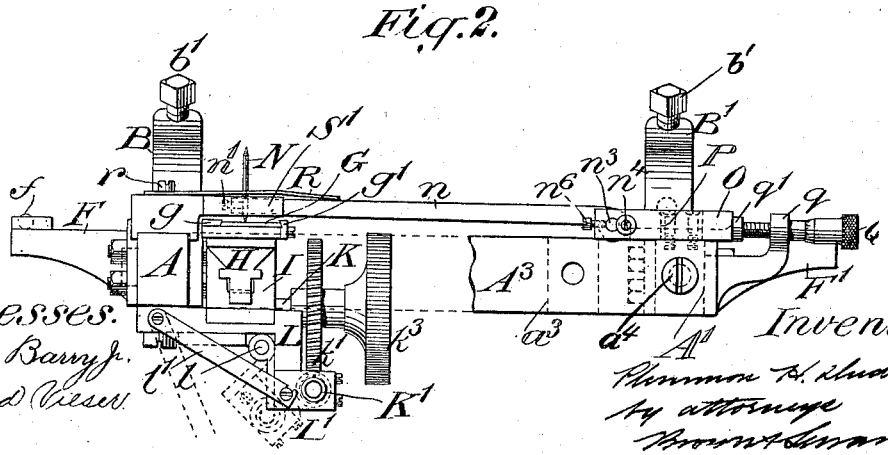

In the accompanying drawings, Figure 1 represents a top plan view of the instrument as it appears when not in use, the drawing being full-sized for the particular purpose of testing railway-rails. Fig. 2 is an end view of the same, one of the end bars being partially broken away to show more clearly the operating mechanism. Fig. 3 is a vertical section through the instrument on the line 3 3 of Fig. 1 and in a direction transverse to the rail, the position which the rail will assume when the instrument is applied thereto being shown in dotted lines in this figure. Fig. 4 is a vertical section through the line 4 4 of Fig. 1. Fig. 5 is a top plan view of the instrument, showing it in operative position with respect to the railway-rail and half-size; and Fig. 6 represents a fragment of the record-plate, on an enlarged scale, illustrating the manner in which the record is made.

The main frame of the instrument consists of a pair of bars A A', held when the instrument is not in use a predetermined distance apart by cross-bars $A^2 A^3$. The bars $A^2 A^3$ are carefully fitted to the bars A A' in order to hold the coacting parts carried, respectively, by the bars A A' in their proper positions with relation to one another until after the bars A A' have been firmly clamped to the rail to be tested, when the cross-bars $A^2 A^3$ are to be removed, for example, by removing the screws $a^4$, one at each of the joints, leaving the parts in operative position, as shown in Fig. 5. In the present instance I have shown the cross-bars $A^2 A^3$ as provided with different sets of recesses $a$ $a'$ $a^2$ $a^3$ for adjusting the bar A' at different distances from the bar A to suit the instrument to different lengths of rail-sections to be tested.

For clamping the bars A A' firmly to the base of the rail I provide each of the bars A A' with a fixed overhanging standard (denoted, respectively, by B and B') and each with a corresponding overhanging standard, (denoted, respectively, by C C'.) The standards B B' may be securely bolted to the bars A A' and are each provided with a permanent bearing-pin $b$ for engaging the outer edge of one of the flanges $d$ of the rail D. The standards B B' are each further provided with a set-screw $b'$ for engaging the top of the flange $d$ of the rail near its edge, as clearly shown in Fig. 3, and forcing the sharp bearing-points E, set in the upper faces of the bars A A', into the base of the rail. It is intended that the screws $b'$ shall have sufficient power to cause the points of the bearings E to enter the metallic base of the rail in order to have a definite length of rail for testing and to secure the bars against the slightest displacement relative to the rail during the operation of the instrument.

The overhanging standards C C' are each provided with a pair of set-screws, (denoted by $c$ $c'$,) the former adapted to engage the outer edge of the flange $d'$ of the rail and force the base of the rail snugly against the bearings $b$ in the standards B B' and the latter $c'$ arranged to bear on the top of the flange $d'$ of the base of the rail and force the bearing-points E' into the base of the rail in a manner similar to that hereinabove described in respect to the bearing-points E.

The standards C are made adjustable along the bars A A' toward and away from the standards B B' conveniently by means of different sets of bolt-holes $e$ $e'$ $e^2$ to accommodate rail-sectors of different widths of base.

The bars A A' are further provided with bearings for the opposite flanges of the base of the rail, spaced from the non-adjacent sides of the bars A A' and at points intermediate of the different sets of bearing-points E E'. These bearings consist of antifriction-rollers $f$, seated in the upper faces of brackets F F' $F^2$ $F^3$, firmly fixed to the bars A A'. It is intended that the base of the rail shall be forced down onto the points E E' by the set-screws $b'$ $c'$ until arrested by the stops $f'$, at which point the base of the rail beyond the bars A A' will rest on the bearing-rollers $f$, the stops $f'$ determining the distance which the bearing-points E E' shall enter the base of the rail and the rollers $f$ preventing the bars A A' from tilting laterally independent of the movement of the rail and at the same time permitting the portions of the rail upon opposite sides of that particular portion under test to have a free movement in a longitudinal direction of the rail under the stress which may tend to depress or elevate the rail, and hence have no disturbing influence upon the results obtained from the elongation and compression of the portion of the rail under test.

The bearing-points of the set-screws $b'$ $c'$ on the base of the rail are in practice about a thirty-second of an inch out of alinement with the bearing-points which engage the under side of the rail, the said point of bearing of the set-screw being by that distance intermediate of the vertical planes passing through the said bearing-points and auxiliary rollers $f$.

The bar A carries the plate for receiving the record and the mechanism for causing the plate to travel continuously while the record is being made and the bar A' carries the needle-supporting mechanism for producing the record on the plate during the test.

The record-receiving plate (denoted by G) is clamped on the upper face of a sliding carriage H conveniently by means of undercut strips or cheek-pieces $g$ $g'$. The carriage H is supported in a dovetailed recess in a way I, the fitting of the carriage to the way being of the highest degree of accuracy known to the art in order that the carriage may have no appreciable play in any direction excepting in the direction in which it is arranged to travel. The carriage, with the plate thereon, is arranged to be moved longitudinally by means of a rack-bar $h$ on its under side in engagement with a pinion $k$ on a shaft K, mounted in suitable bearings in a bracket L, fixed to the bar A. The bracket L also serves as a support for the way I in which the plate-carrying carriage is mounted.

On the shaft K there is fixed a worm-wheel $k'$, adapted to engage a worm $k^2$, driven by a shaft K', in the present instance a flexible shaft leading to and operated by a suitable motor, an electric motor M being conveniently shown for this purpose in connection with Fig. 5. There is also located on the shaft K a milled wheel $k^3$ for operating the pinion $k$, and hence the carriage H, independently of the worm $k^2$, the latter being for this purpose mounted in a bearing L', hinged to the bracket L at $l$ and capable of being swung out of engagement with the worm-wheel $k'$ into the position shown in dotted lines in Fig. 2. A brace $l'$ serves to hold the bearing L' in position to hold the worm in engagement with the worm-wheel, and upon releasing the brace $l'$ from the bearing the latter may be permitted to drop out of the way.

The object of operating the plate independently of the worm $k^2$ will be hereinafter more particularly explained.

The recording-needle is denoted by N. It is fixed in the free end of a swinging arm $n$ by means of a set-screw $n'$. The arm $n$ is mounted at its opposite end by means of needle-bearings $n^2$ $n^3$ in the bifurcated end of a sliding block O. One of the bearings, $n^3$, for example, is made adjustable toward and away from the opposite bearing to tighten or loosen the contact of the arm with its bearings, a screw $n^4$, provided with a collar $n^5$, adapted to overlap the end of the bearing $n^3$, being utilized to push the bearing $n^3$ toward the bearing $n^2$ or permit it to move away from the bearing $n^2$ and a set-screw $n^6$ being utilized to lock the bearing $n^3$ in its adjusted position.

The sliding block O is provided with a centrally-depressed portion $o$, in the bottom of which there is an elongated slot $o'$. A T-shaped guide P has its stem extended through the slot $o'$ and is held in position relatively to the bar A' by screws $p$, which extend downwardly through the stem of the guide E into the bar A'. The top of the T-shaped guide P is adapted to precisely fit within the recess $o$ in the sliding block O, and when the screws $p$ are turned to depress the guide P the wings of the guide P will engage the bottom of the recess $o$ in the sliding block O and lock it firmly to the bar A'. This is provided for by stopping the stem of the T-shaped guide P a short distance above the surface of the bar A'.

The sliding of the block O, and with it the adjustment of the record-making needle N to different positions transversely of the plate G for the purpose of forming different lines of record upon the same plate, may be effected by a micrometer-screw Q of any well-known or approved form seated in a bracket-arm $q$, fixed to the bar A' and having a swiveled connection at $q'$ with the end of the sliding block O.

The free end of the arm $n$, carrying the needle N, may be conveniently pressed toward the face of the record-receiving plate G with the required amount of force by means of a plate-spring R, fixed at one end to the bar A, as at $r$, and the said free end of the arm $n$ may be prevented from lateral vibration by means of a pair of guides S S', fixed to and extending inwardly from the bar A and resting with their free ends in proximity to the opposite sides of the free end of the arm $n$.

The above-described instrument may be practically used as follows: Assuming the spacing or cross-bars $A^2$ $A^3$ to be firmly united to the supporting-bars A A' the latter are clamped firmly to the base of a railway-rail and while the bars $A^2$ $A^3$ are still in position, thereby insuring the proper relation of the record-receiving and record-making mechanisms with respect to each other. When the supporting-bars A A' have been thus firmly secured in position, the spacing-bars $A^2$ $A^3$ are to be removed, leaving the instrument arranged as clearly represented in Fig. 5. When used, as here shown, in connection with a railway-rail, the instrument is to be applied to the rail intermediate of two consecutive railway-ties, where the rail is left free to receive the full effect of the load. When thus secured, the motor M may be placed in position—for example, on a near railway-tie, or for that matter upon any suitable support placed temporarily in position—and the shaft K' for operating the worm connected with the motor. At this point it is desirable to use the precaution of ruling the plate which is to receive the record with respect to the path which the needle for making the record is to assume during the travel of the plate, and to this end I have provided for releasing the worm from the worm-wheel and driving the plate by the hand-wheel $k^3$. If then the worm be disengaged from the worm-wheel and the needle N be lowered into operative engagement with the plate and the wheel $k^3$ be operated to cause the plate G to travel its length or a distance sufficient to receive the record, a right line will be formed on the plate which will be the reference or guide line with respect to the irregular line which the needle will travel during the elongation and compression of the metal of the rail between the points of the bars A and A' while a train is passing over it. This having been done, the plate G is returned to its normal position by reversing the movement of the hand-wheel $k^3$, and the worm is placed in engagement with the worm-wheel ready to operate the plate G by the driving-motor M whenever the latter shall be set in operation. As different weights pass onto and off the space between the bars A A' along the rail D its base will be alternately depressed or humped, causing, respectively, an elongation and compression of that rail-section intermediate of the bars A A' and so causing the recording-needle to travel transversely toward and away from the reference or guide line a greater or lesser distance, depending upon the amount of deflection.

In Fig. 6 the right line, along which the recording-needle will travel under normal conditions and when there is no deflection or humping of the rail, is denoted by $t$, and the path which the recording-needle travels during the continuous movement of the plate G and while the rail is being subjected to different stresses under the loads—as, for example, under the stress of the engine and the cars of different weights attached to it—is denoted by the broken line $t'$.

By means of the above-described instrument the weakness or strength of a rail or bar for the purposes in hand may be accurately discovered without removing the bar or rail from its position, and among the many advantages resulting from its use railway-rails may be condemned and replaced before they have reached the condition where they would render an accident inevitable.

It is obvious that slight changes might be resorted to in the form and arrangement of the several parts without departing from the spirit and scope of my invention. Hence I do not wish to limit myself strictly to the structure herein set forth; but

What I claim is—

1. An instrument for testing rails under moving trains comprising means for accurately segregating a portion of the rail to be tested and at the same time leaving said segregated portion free to move laterally under the influence of weight on adjacent portions of the rail, in combination with means for automatically making a continuous record of the amount of the elongations and compressions of the rail as they follow one another in rapid succession under the wheels of a moving train, substantially as set forth.

2. An instrument for testing rails under moving trains comprising means for attaching the instrument to the rail at one side of the neutral axis of the rail to segregate a portion of the rail to be tested, in combination with means for automatically making a continuous record of the amount of the elongation and compression of that side of the rail where the instrument is attached, substantially as set forth.

3. An instrument for testing rails under a moving train, comprising means for segregating a portion of the rail to be tested in combination with record-receiving mechanism and a record-making device consisting of a longitudinally-rigid bar or arm fixed to move in accord with the elongation and compression of the segregated portion of the rail and provided with a needle, substantially as set forth.

4. In combination, bars provided with sharp bearings and with antifriction-bearings spaced from the sharp bearings, record-receiving mechanism carried by one of the bars, record-making mechanism carried by another of the bars and means for forcing a rail onto the sharp bearings into engagement with the antifriction-bearings, substantially as set forth.

5. In combination, bars, means for securing the bars to a rail, a record-receiving plate or strip supported by one of the bars, a recording-needle secured to another of the bars, a motor for moving the plate, a gear connecting the motor with the plate-support, means for moving the plate by hand and means for disengaging and engaging the gear intermediate of the motor and the plate-support, substantially as set forth.

6. The combination with the bars for supporting the record-receiving and record-making mechanisms and means for securing them to a rail, of the spacing or cross bars and means for removably securing the spacing or cross bars to the said supporting-bars, substantially as set forth.

PLIMMON H. DUDLEY.

Witnesses:
 FREDK. HAYNES,
 C. S. SUNDGREN.